(12) United States Patent
Herpel et al.

(10) Patent No.: US 6,334,325 B1
(45) Date of Patent: Jan. 1, 2002

(54) METHOD FOR CONTROLLING THE EVAPORATOR TEMPERATURE OF A VEHICLE AIR CONDITIONER

(75) Inventors: Thomas Herpel, Ismaning; Stefan Morgenstern, Munich, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/563,530

(22) Filed: May 3, 2000

(30) Foreign Application Priority Data

May 3, 1999 (DE) .......................... 199 20 093

(51) Int. Cl.⁷ ................................ B60H 1/00
(52) U.S. Cl. ................. 62/277; 62/176.6; 236/44 C
(58) Field of Search .................. 62/176.6, 176.3, 62/226, 227, 228.1, 228.4, 228.5, 229; 236/44 R, 44 A, 44 C; 165/222, 223, 225, 230

(56) References Cited

U.S. PATENT DOCUMENTS 5,669,226 A * 9/1997 Kurahashi et al. ............ 62/227
6,029,466 A * 2/2000 Wieszt ........................ 62/227

FOREIGN PATENT DOCUMENTS

| DE | 37 39 372 | 6/1989 |
|---|---|---|
| DE | 42 12 680 | 10/1992 |
| DE | 196 34 774 | 3/1997 |
| DE | 196 08 015 | 5/1997 |
| DE | 197 28 577 | 2/1999 |
| DE | 197 28 578 | 2/1999 |
| JP | 59-134006 | 8/1984 |
| JP | 60-176809 | 9/1985 |

* cited by examiner

Primary Examiner—Harry B. Tanner
(74) Attorney, Agent, or Firm—Crowell & Moring LLP

(57) ABSTRACT

A method is provided for controlling the evaporator temperature in a vehicle air conditioner having an evaporator, a compressor, a condenser and an expansion element, in which the evaporator temperature is adjusted as a function of operating conditions. An evaporator temperature control, in conjunction with an optimizing of consumption and comfort, is achieved in that a first evaporator temperature value ($T_{V\_F}$) is determined with respect to a desired air humidity, a second evaporator temperature value ($T_{V\_F}$) is continuously determined for ensuring a sufficient cooling capacity, and the lowest of the two evaporator temperature values is selected as the evaporator temperature ($T_V$) to be set.

13 Claims, 8 Drawing Sheets

METHOD FOR CONTROLLING THE EVAPORATOR TEMPERATURE OF A VEHICLE AIR CONDITIONER

BACKGROUND AND SUMMARY OF THE INVENTION

This application claims the priority of German Application No. 199 20 093.9, filed May 3, 1999, the disclosure of which is expressly incorporated by reference herein.

The invention relates to a method for controlling the evaporator temperature of a vehicle air conditioner and, more particularly, to a method for controlling the evaporator temperature of a vehicle air conditioner having an evaporator, a compressor, a condenser and an expansion element, in which the evaporator temperature is adjusted as a function of operating conditions.

Vehicle air conditioners are generally known. As a rule, a compressor compresses a gaseous refrigerant. When the refrigerant flows through a condenser, an expansion element and an evaporator, the air, which also flows through the evaporator, is cooled. The lowering of the air temperature usually takes place to a temperature of approximately 1° C. to 3° C. Since this temperature is usually below the dew point of the air taken in for cooling, water condenses out at the evaporator and the air is dried. Subsequently, in most operating conditions, the cooled air is heated again so that it reaches the interior in an optimally temperature-moderated manner. The cooling to 1° C. to 3° C., which takes place irrespective of the air-conditioning demand, therefore requires too much refrigerating capacity.

It will therefore be an object of the present invention to always operate the air conditioner such that the air is cooled only to a temperature required at the time. For this purpose, it is necessary to adjust the evaporator temperature, specifically according to the requirements in the vehicle.

From German Patent document DE 196 08 015 C, an air mixing system for a vehicle air conditioner is known for lowering the energy consumption, in case which, among other things, the specific fresh air enthalpy is taken into account. In particular, the smallest specific enthalpy difference is set at a heat exchanger. For finding the specific enthalpy, the temperature and the relative humidity of the air are measured.

However, for taking into account all operating conditions as well as the comfort and safety aspects in the case of a vehicle, it is necessary to further develop such an air conditioner.

It is an object of the present invention therefore to provide a method for operating an air conditioner which takes into account all conditions with respect to comfort and safety.

This object is achieved by a method for controlling the evaporator temperature of a vehicle air conditioner having an evaporator, a compressor, a condenser and an expansion element, in which the evaporator temperature is adjusted as a function of operating conditions. A first evaporator temperature value is determined with respect to a desired air humidity. A second evaporator temperature value is determined for ensuring a sufficient cooling capacity. The lowest of the two evaporator temperature values is selected as the evaporator temperature to be set.

For avoiding an unnecessary energy consumption, the evaporator temperature is adjusted to a temperature value which takes into account the comfort aspects as well as the safety aspects. On the one hand, an evaporator temperature value with respect to a certain air humidity is determined. On the other hand, an evaporator temperature value for ensuring a sufficient cooling capacity is determined. Then the lowest of the above-mentioned evaporator temperature values is selected for use.

The evaporator temperature value which is determined with respect to a desired air humidity preferably is to be determined as a function of the misting criteria of the vehicle windows and comfort criteria. As a result, it is ensured, on the one hand, that the driver's view is not impaired. On the other hand, a pleasant condition, which is not too dry, of the air in the interior is ensured for the vehicle occupants. For both cases, a maximal acceptable air humidity is obtained in the vehicle. Thus, the dew point of the air must not fall below the temperature of the interior surfaces of the windows, which must be computed for this purpose. As the comfort limit value, a maximally permissible enthalpy of the air in the vehicle interior is used which is determined from the humidity and the temperature.

The humidity of the interior is, among other things, a function of the occupants' water vapor emission as well as of the amount and humidity of the blow-in air. The evaporator temperature, among other things, can influence the condition of the blow-in air. This evaporator temperature must be adjusted such that the humidity of the interior does not exceed the permissible limits for meeting the misting and comfort requirements.

The evaporator temperature value, which aims at a sufficient cooling capacity, is influenced by the desired blow-in temperature and the undesirable heating in the air guiding components that are connected behind the evaporator. Preferably, when determining the assigned evaporator temperature to ensure sufficient cooling, the interior temperature, the ambient temperature and/or the sun radiation are taken into account as influential factors for the undesirable heating.

A particularly preferred embodiment is characterized in that a change-over to the above-mentioned method takes place only when certain operating conditions exist. Thus, at critical operating conditions, an evaporator temperature is ensured which is always sufficiently low.

Other objects, advantages and novel features of the present invention will become apparent from the following detailed description of the invention when considered in conjunction with the accompanying drawings.

DETAILED DESCRIPTION OF THE DRAWINGS

Figure 1:
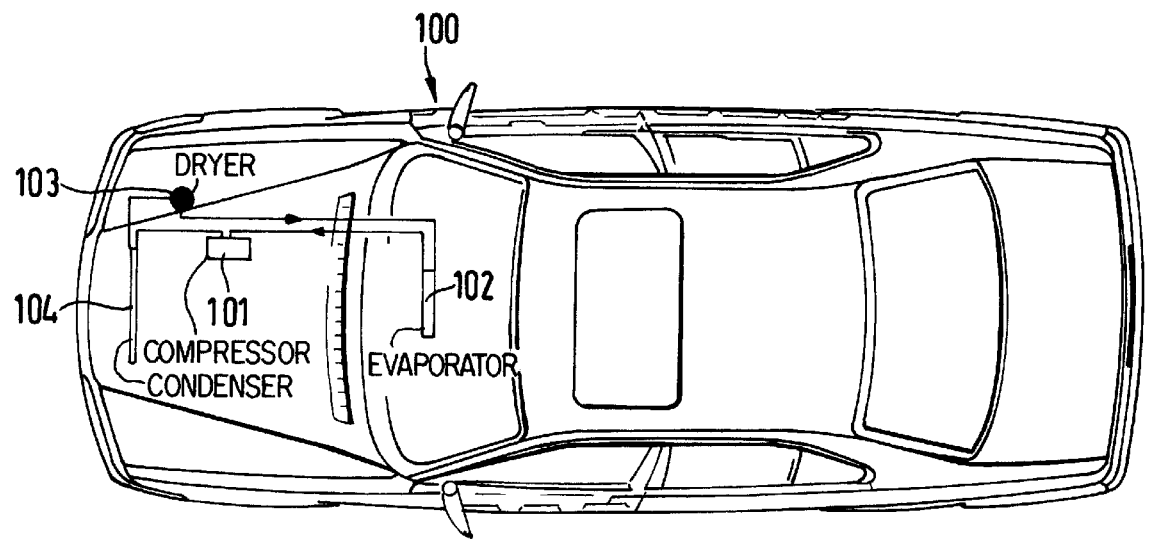
FIG. 1 is a schematic representation of an air conditioner system in a vehicle.

FIG. 1 is a schematic top view of a vehicle, in which an air conditioner is arranged having a compressor 101, an evaporator 102, a dryer 103 and a condenser 104. By varying the evaporator temperature according to the invention, the temperature and the humidity of the blow-in air for the vehicle are changed. While taking into account the air conditioning comfort of the occupants in the vehicle, the air humidity is increased by raising the evaporator temperature. This option is limited by the danger of window misting and possibly reaching a "mugginess limit". Furthermore, sufficient cooling performance must be ensured.

In the following, an embodiment of a method according to the invention will be described which, within the scope of the method, uses logic that permits a selection of the evaporator temperature as a function of parameters existing in the vehicle, such as the outside temperature, the inside temperature, etc.

Figure 2:
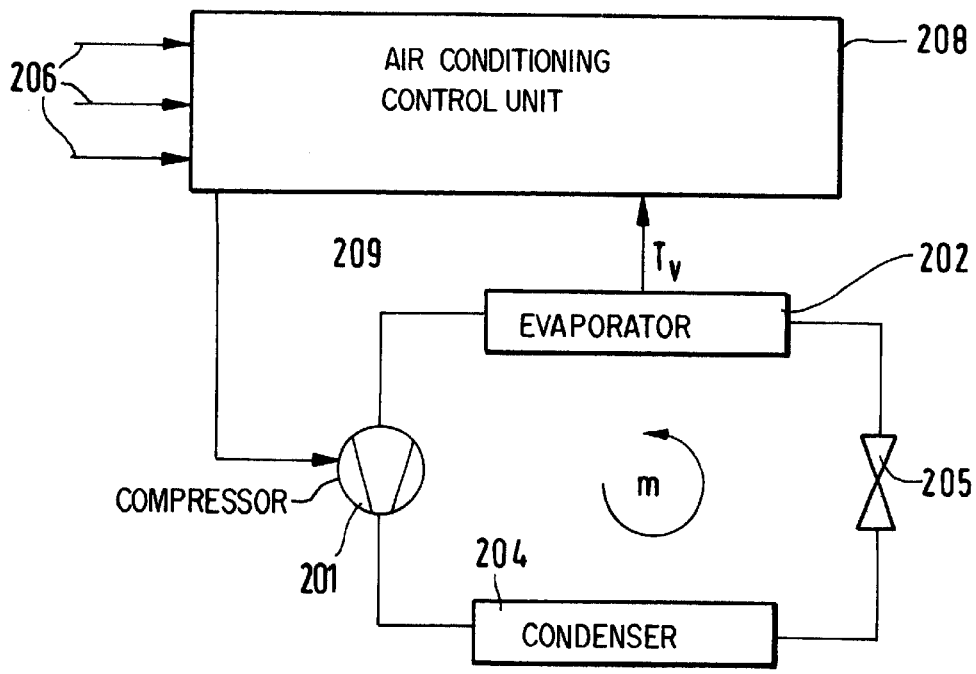
FIG. 2 is a schematic block diagram of the refrigerant circulation system of an embodiment of an air conditioner according to the invention with a control.

In the present embodiment, a compressor is used whose working volume can be varied. Such a compressor is illustrated in a block diagram in FIG. 2 via reference number 201 and is controlled by an air-conditioning control 208. By means of the different volume flows in the refrigerant circulation system of the air conditioner, different refrigerating performances can be varied. This has the result that the temperature of the evaporator can be adapted. For the working volume adjustment, the compressor has an electric input which is acted upon by a signal from the control device. Input signals 206, such as a given outside temperature and the evaporator temperature $T_V$, arrive in the air conditioning control 208. The temperature $T_V$ comes from an evaporator 202 through which the coolant is guided to the compressor, the condenser 204 and the expansion valve 205.

In the following, the logic of the evaporator temperature control will be described. The following conditions must be observed during control: (1) the occupants' comfort with respect to the air humidity must be ensured; (2) a misting of windows should be avoided; and (3) for the cooling, a sufficient cooling capacity should be made available. In order to meet these conditions in a combined fashion, different relationships must be taken into account which will be explained in the following.

Figure 3:
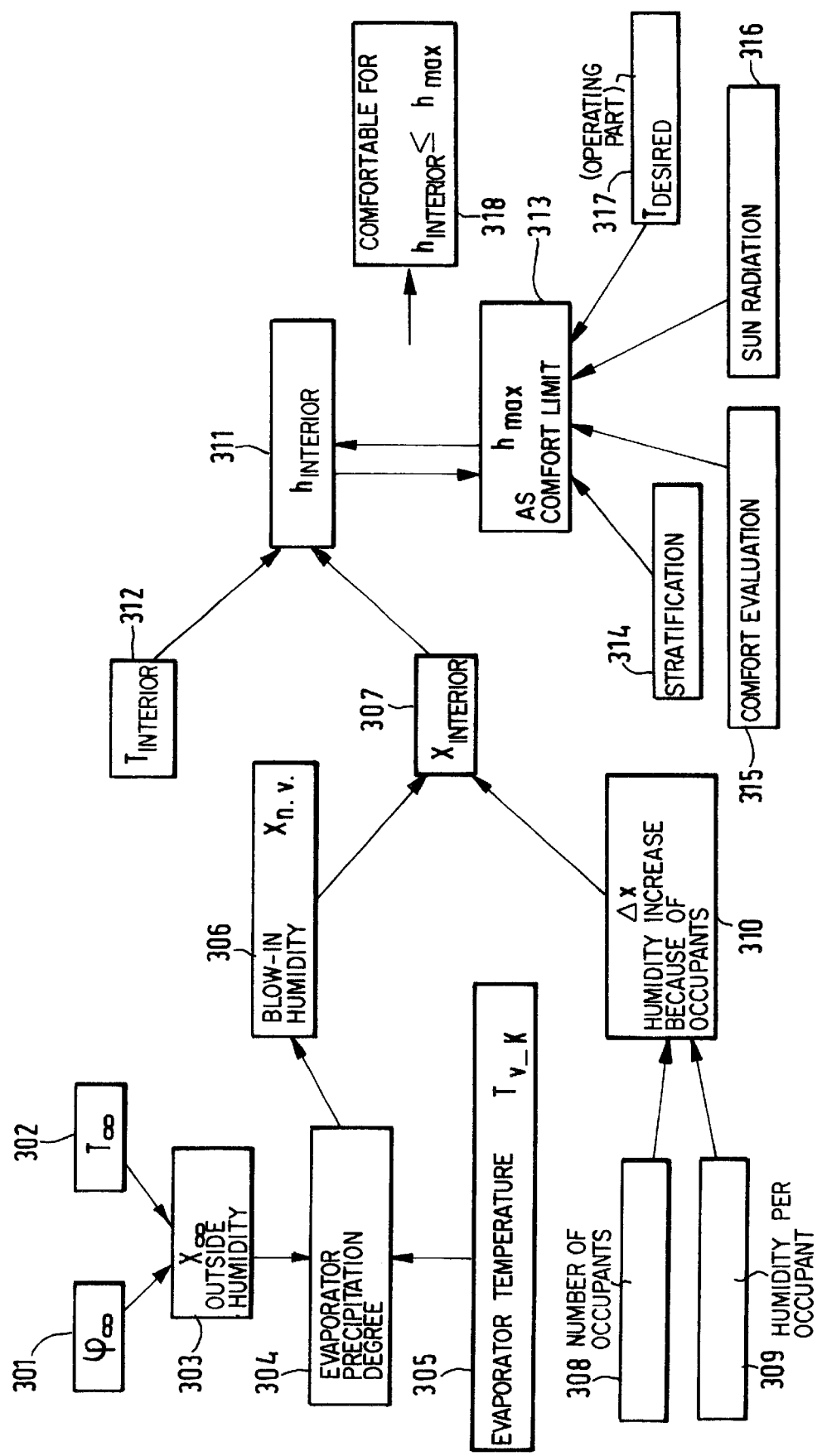
FIG. 3 is a flow diagram which illustrates the operating chain for determining the comfort in the vehicle interior.

The evaluation of the comfort in the vehicle interior is illustrated in FIG. 3. Starting from the left, the forming of interior humidity $x_{interior}$ 307 is shown. A significant factor for the interior humidity $x_{interior}$ is the blow-in humidity $x_{n,V}$ 306, which depends mainly on the evaporator temperature $T_{V\_K}$ 305, because it is responsible for the drying of the outside air (humidity $\phi \infty$, 301, and temperature $T \infty$, 302) (absolute outside humidity $x \infty$). The function of the evaporator precipitation degree 304 is decisive for the drying of the outside air.

The interior air is also enriched with water by the occupants, which is expressed by a humidity increase $\Delta x$, 310. The humidity increase $\Delta x$ 310 is a function of the number of occupants 308 as well as of the humidity per occupant 309. The number of occupants 308 can be determined by way of a seat occupation sensor, the humidity can be determined by way of given parameters.

From the interior humidity $x_{interior}$ 307, and the interior temperature $T_{interior}$ 312, a specific enthalpy (enthalpy of the humid air) can be determined for the occupant compartment $h_{interior}$ 311. This specific enthalpy 311 is now compared with a comfort limit $h_{max}$ 313 and, in the present invention, must always be lower than this limit value. The permissible specific vehicle interior enthalpy $h_{max}$ 313 basically originates from a comfort evaluation carried out with occupants. In addition, three correction factors are provided, specifically a stratification adjustment 314, the sun radiation 316 and the $T_{desired}$ adjustment 317. If the driver selects a cold stratification adjustment or a low desired temperature at an operating part 317, this may have as its goal not only a cooling of the vehicle interior but possibly also the desire to obtain fresher air. In this case, it is possible to correct the maximal enthalpy ($h_{interior}$) downward.

The comparison of the determined specific enthalpy ($h_{interior}$) with the maximally permissible interior enthalpy $h_{max}$ is illustrated by the box 318.

In order to implement a comfortable environment for the vehicle occupants with respect to the air humidity, the evaporator temperature $T_{V\_K}$, as illustrated in FIG. 3, plays a decisive role. In particular, it should be noted here that the enthalpy has represented an excellent quantity for judging the comfort in the interior. In this context, reference is made to the publication by Fanger, P. O. "Air Humidity and Perceived Air Quality, Laboratory of Environment of Energy, Department of Energy Engineering, Technical University Denmark" of Nov. 19, 1997. Fanger has found that the air quality can be determined particularly well as a function of the specific enthalpy, that is, of various combinations of the air temperature and the air humidity.

As the next point of the required conditions, the avoidance of the misting of windows is to be taken into account.

Figure 4:
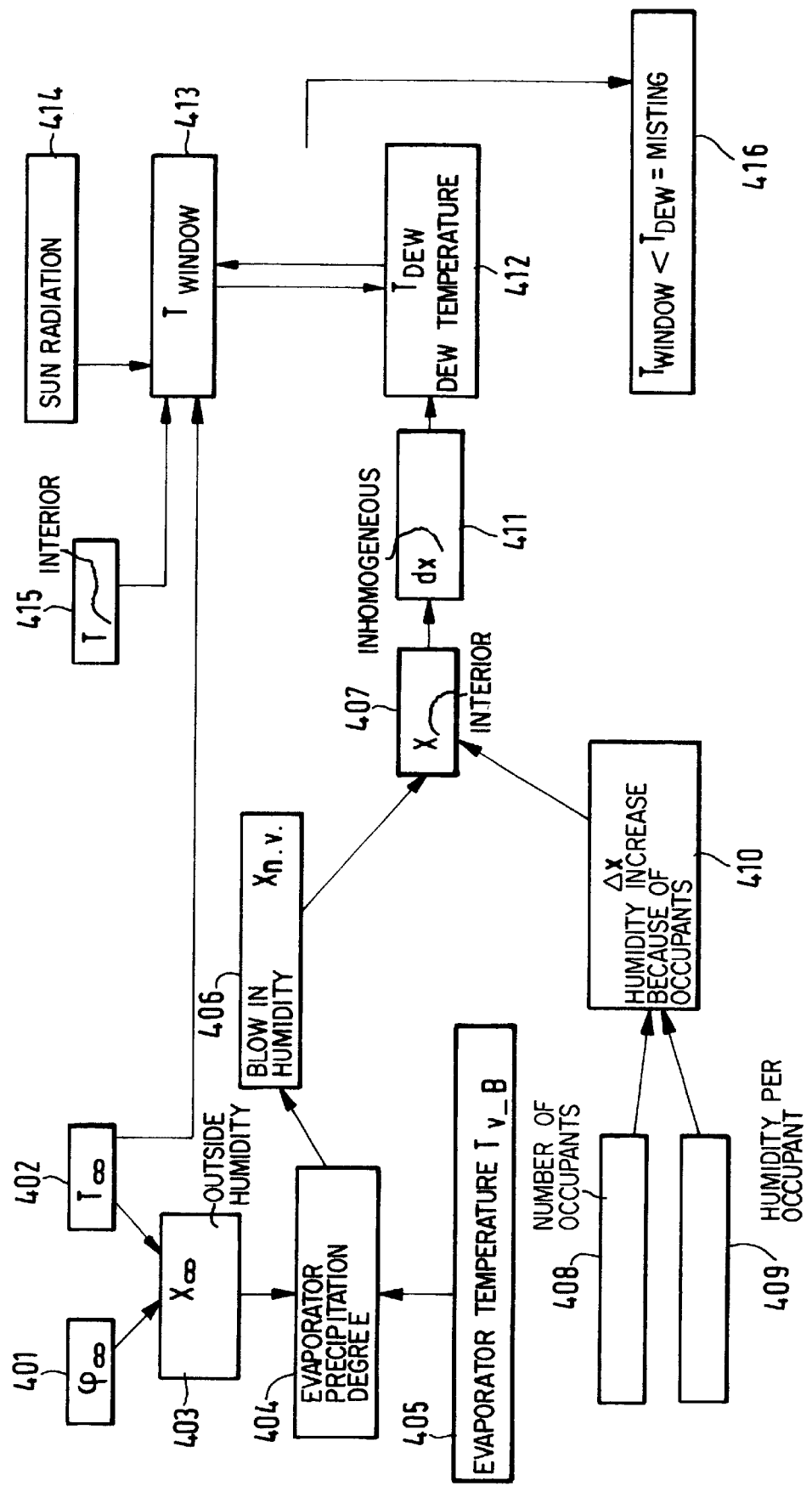
FIG. 4 is a flow diagram which illustrates the operating chain for determining the window misting.

By means of FIG. 4, this will be explained in the following. In this case, the values illustrated by reference numbers 401, 402, 403, 404, 406, 408, 409, 410, 407 and 415 correspond to the respective quantities in FIG. 3. FIG. 4 shows that the formation of the vehicle interior humidity $x_{interior}$, 407 is identical with that of the comfort assessment. On the basis of $x_{interior}$, a conclusion can be drawn with respect to the dew temperature which, together with the window temperature $T_{window}$, 413, is a decisive factor for possible window misting. The quantity $dx_{inhomogeneous}$, 411, which is placed between the vehicle interior humidity $x_{interior}$ and the dew temperature $T_{dew}$, has the purpose of taking into account possible inhomogeneities of the air mixing. The air does not have the same humidity everywhere. On the contrary, for example, the presence of human beings causes variations in the distribution of the humidity. The interior window temperature $T_{window}$, 413, which, in addition to the dew temperature $T_{dew}$, 412, is responsible for the misting, is a function of the outside temperature ($T\infty$) and the vehicle interior temperature ($T_{interior}$) 415. The influence quantity "sun radiation" 414 is found here again. During the day, when the sun is shining, the window temperature will rise. However, at night, the cold radiation background—sky—can be taken into account. When comparing the window temperature $T_{window}$ with the dew temperature $T_{dew}$, care must be taken that the dew temperature $T_{dew}$ is not lower than the window temperature $T_{window}$. The evaporator temperature $T_{V\_B}$ must be selected correspondingly in FIG. 4. This results in another criterion for an upper evaporator temperature limit.

Next, the ensuring of a sufficient cooling capacity will be discussed.

Figure 5:
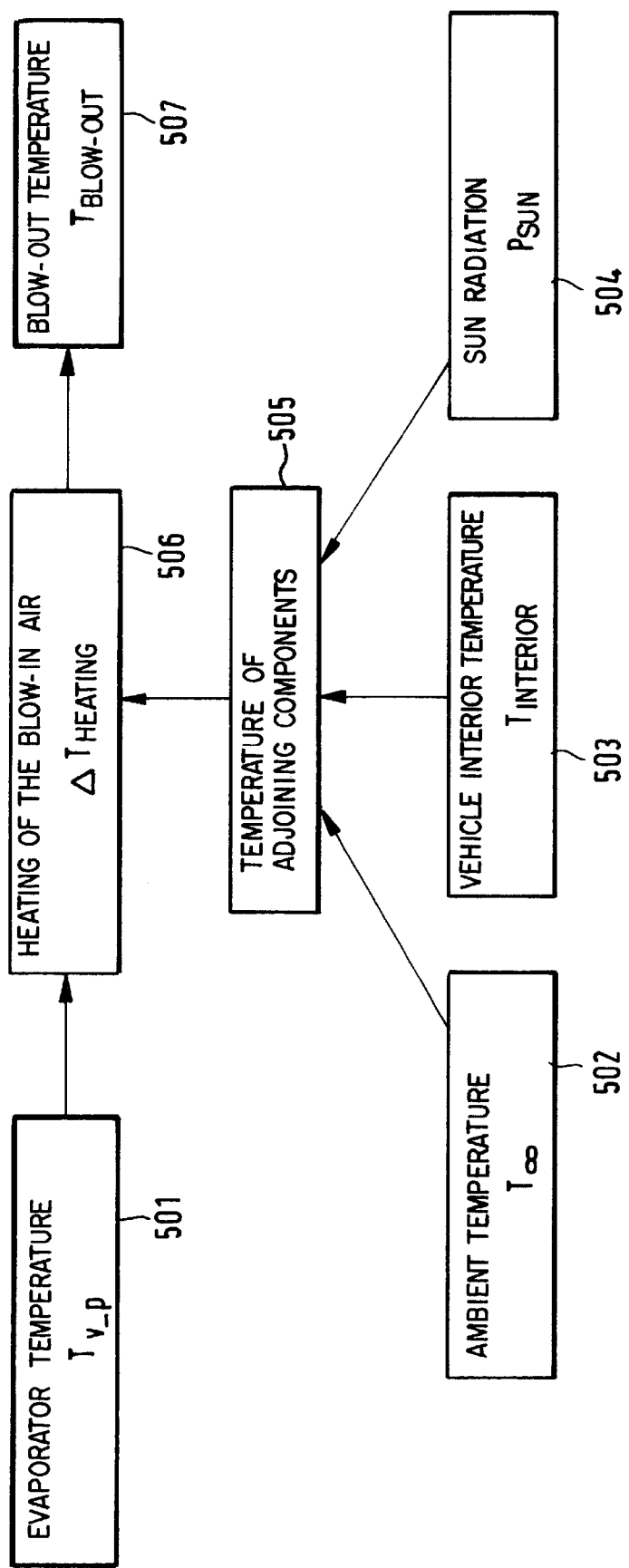
FIG. 5 is a flow diagram which illustrates the operating chain for maintaining the performance limit.

At momentary evaporator temperature values of from 1 to 3° C., the problem of staying within the cooling capacity limit does not arise. However, if the evaporator temperature is set to a temperature which is not as low, it is possible that the vehicle interior may not be cooled sufficiently. From a stratification position and the values of the interior temperature, the exterior temperature and the adjusted desired temperature, a temperature for the air from the ventilation grids is obtained. If the stratification is set to "cold", according to the computation of the control unit, in the extreme case, only air can be fed to the interior which is taken directly from the evaporator. With respect to the evaporator temperature control, this means that only maximally the desired temperature should be reached which is required for the compensation on the ventilation plane. In order to take into account the heating of the air in warmed-up ducts, the temperature limit $T_V$ must be adapted. This is schematically illustrated in FIG. 5. The blocks 502 (ambient temperature), 503 (vehicle interior temperature) and 504 (sun radiation) determine the temperature of the adjoining components which, in turn, affects the heating of the blow-in air 506 in the form of a heating $\Delta T_{heating}$. As the result of this influence, the evaporator temperature $T_{V\_P}$ is still heated until it exits the ventilation grids as the blow-out temperature $T_{blow-out}$.

Figure 7:
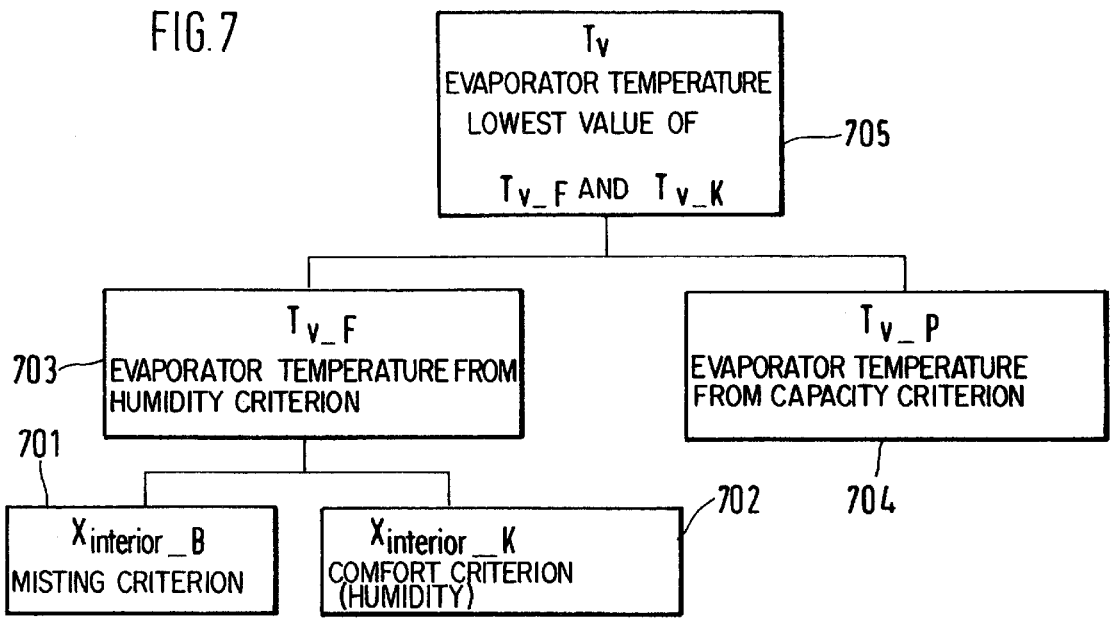
FIG. 7 is a block diagram which illustrates the selection criteria for the evaporator temperature.

FIG. 7 illustrates an overriding determination of the evaporator temperature $T_V$ from all above-described evaporator temperatures. Essentially, the lowest value of the evaporator temperature values $T_{V\_F}$ and $T_{V\_P}$ is selected as the evaporator temperature $T_V$, 705, to be set—$T_{V\_F}$ 703 representing the evaporator temperature of the humidity criterion and $T_{V\_P}$ 704 representing the evaporator temperature of the capacity criterion. The humidity criterion, in turn, is obtained from the misting criterion 701 which was selected on the basis of the misting limit, as well as the comfort criterion 702 which was selected on the basis of the maximal air enthalpy in the vehicle interior. In this context, reference is made to the explanations concerning FIGS. 3 to 5.

Figure 9:
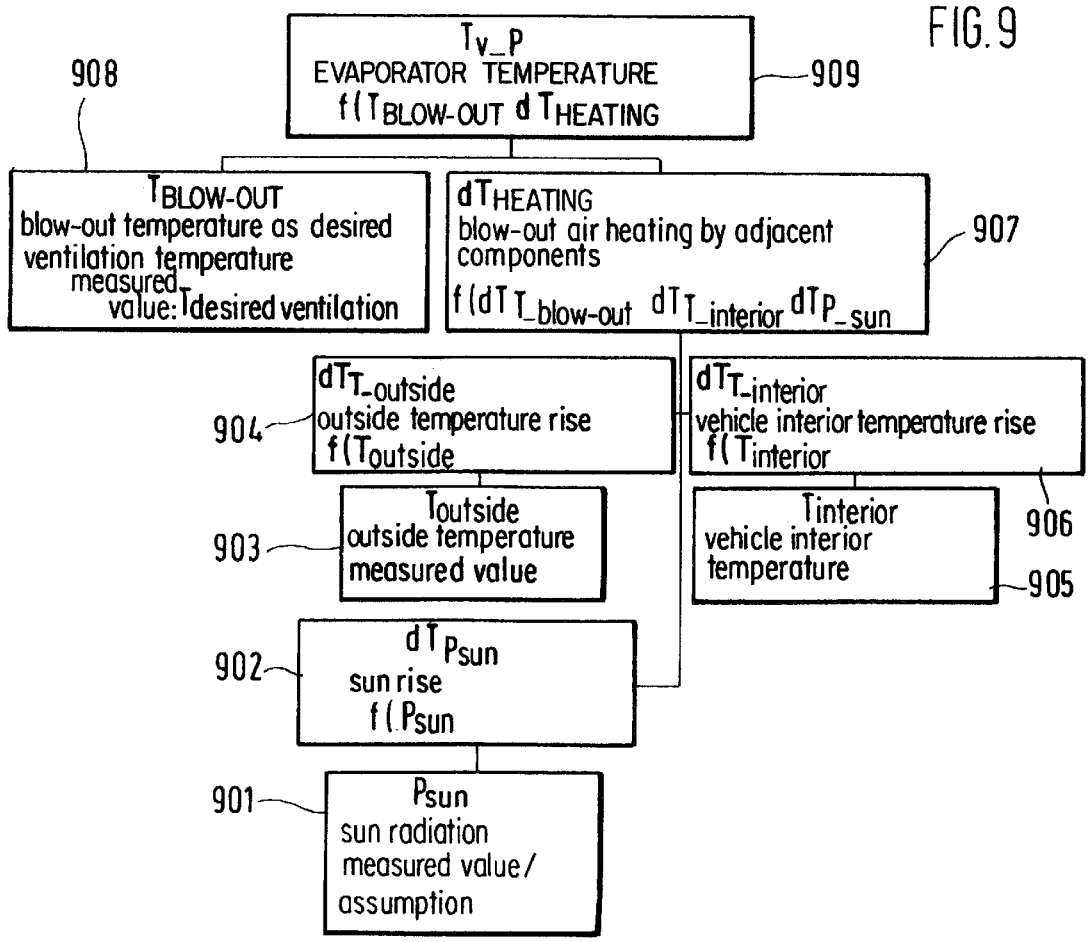
FIG. 9 is a block diagram which illustrates the evaporator temperature under the criterion of the cooling capacity.

The evaporator temperature determination with respect to the capacity will be illustrated in greater detail in FIG. 9. According to reference number 909, the evaporator temperature $T_{V\_P}$ represents a function of the blow-out temperature $T_{blow-out}$ and of the heating of the blow-in air $\Delta T_{heating}$. According to blocks 901 to 908 in FIG. 9, the sun radiation $P_{sun}$, 901, the sun rise $Dt_{P\_sun}$, 902, the vehicle interior temperature $T_{interior}$, 905, the outside temperature $T_{outside}$, 903, the interior temperature rise $Dt_{T\_interior}$, 906, and the outside temperature rise $Dt_{T\_outside}$, 904, are taken into account in this case. This results in the blow-out air heating $Dt_{heating}$ in 907 which, together with the blow-out temperature as the desired ventilation value $T_{blow-out}$, 908, leads to the evaporator temperature $T_{V\_P}$.

Figure 8:
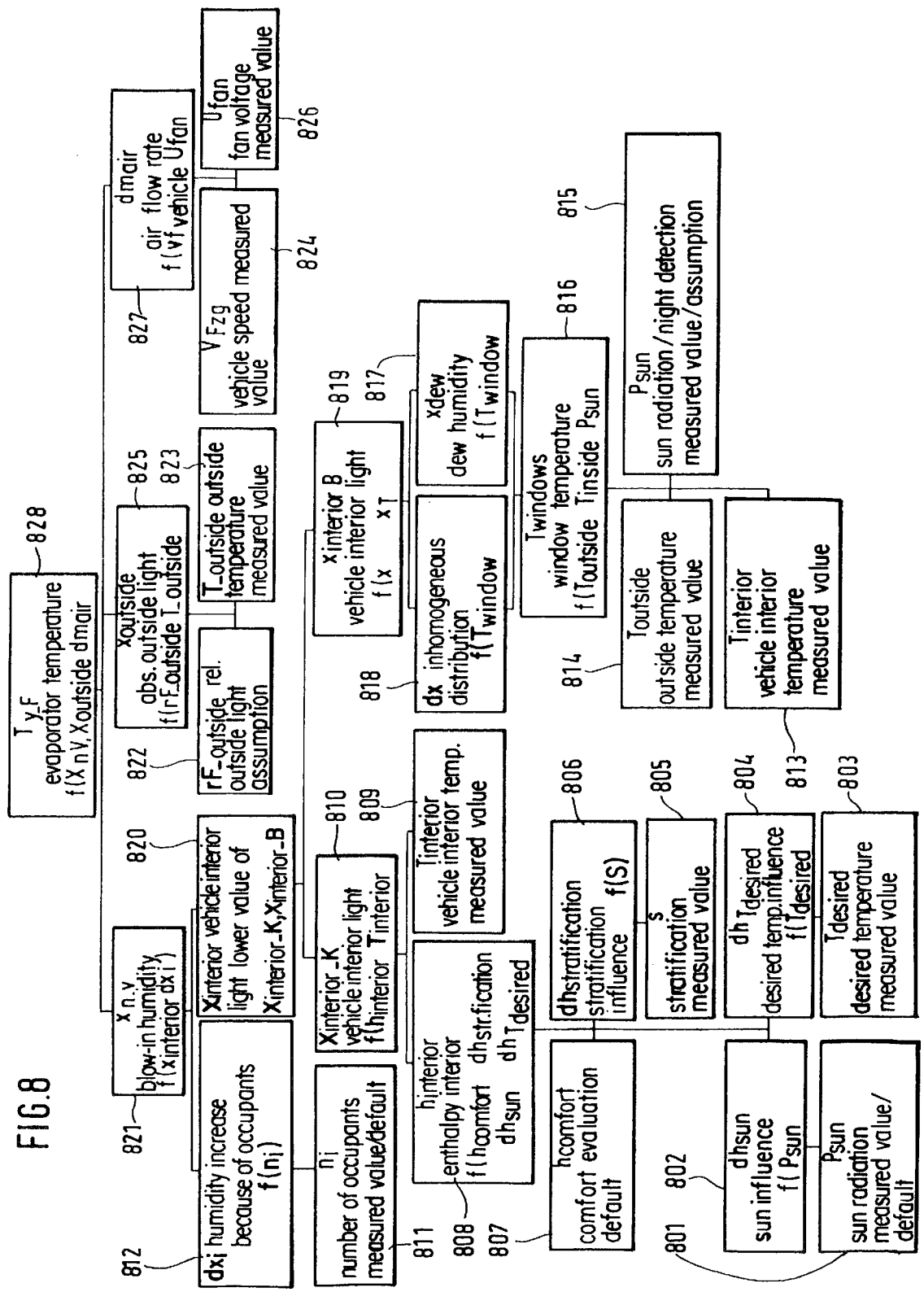
FIG. 8 is a block diagram which illustrates the evaporator temperature taking into account the humidity criterion.

The evaporator temperature control from the humidity criterion, which is illustrated in FIG. 7 at reference number 703, can be determined as indicated in greater detail in FIG. 8. By means of the sun radiation $P_{sun}$, 801, the sun influence $dh_{sun}$, 802, the desired-temperature influence $T_{desired}$, 803, the desired temperature $dh_{Tdesired}$, 804, the stratification value S, 805, the stratification influence $dh_{stratification}$, 806, and the comfort evaluation $h_{comfort}$, 807, the permissible specific enthalpy $h_{interior}$, 808, can be determined. Together with the vehicle interior temperature $T_{interior}$, the vehicle interior humidity $X_{interior\_K}$ can be determined.

On the other hand, by way of the vehicle interior temperature $T_{interior}$, 813, the outside temperature $T_{outside}$, 814 and the sun radiation $P_{sun}$, 815, the window temperature $T_{window}$, 816, can be determined. By taking into account the inhomogeneous distribution $dx_{inh}$, 818, as well as the dew humidity $X_{dew}$, 817, the maximally permissible vehicle interior humidity $x_{interior\_B}$, 819 (misting criterion) is obtained. The vehicle interior humidity $X_{interior}$, 820, is then selected as the lowest value of $X_{interior\_K}$ and $X_{interior\_B}$.

The vehicle interior humidity $x_{interior}$, 820, together with the humidity increase resulting from the occupants $dx_I$, 812, which is determined from the number of occupants $n_I$, 811, results in the blow-in humidity $X_{n.V.}$, 821. The blow-in humidity $x_{n.V.}$, 821, together with the absolute outside humidity $x_{outside}$, and the rate of air flow $dm_{air}$, 827, results in the evaporator temperature $T_{VF}$, 828. The absolute outside humidity $x_{outside}$, 825, can, in turn, be determined by way of the relative outside humidity $rF_{outside}$, 822, and the outside temperature value $T_{outside}$, 823. The rate of air flow $dm_{air}$, 827, can be determined by way of the vehicle speed $v_{veh}$ 824, and the fan voltage $U_{fan}$, 826.

On the whole, by means of the above-indicated evaporator temperature control, an air-conditioning control can be implemented which meets the comfort conditions for the occupants with respect to air humidity, avoidance of window misting and ensuring a sufficient cooling capacity.

Figure 6:
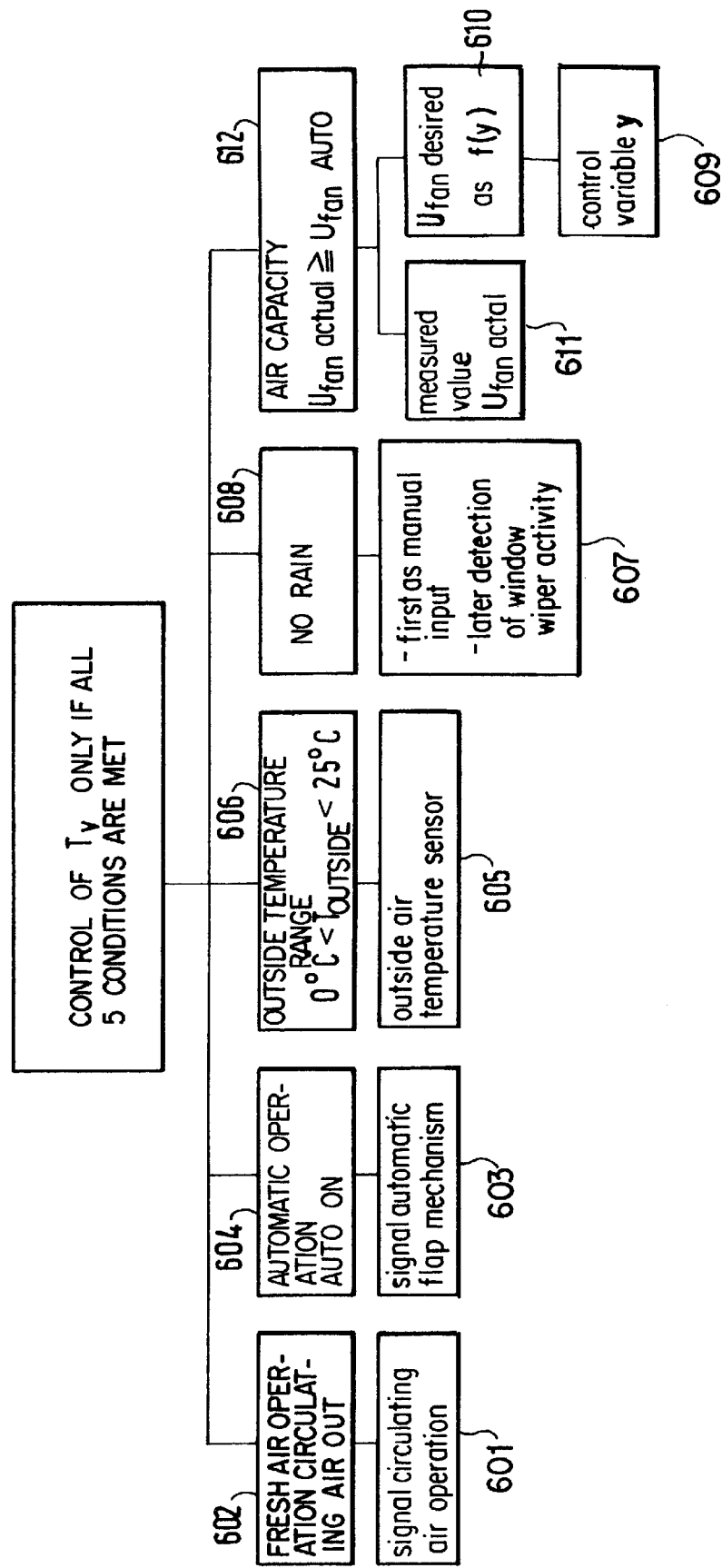
FIG. 6 is a block diagram which illustrates the conditions for an evaporator temperature control according to the invention.

However, in the present embodiment, the control according to the invention is not carried out in the case of every environmental or operating condition. FIG. 6 illustrates that the control of the evaporator temperature $T_V$ will only be carried out in the above-described manner if six conditions are met. 1. The fresh-air operation must be set (602). 2. In addition, the air conditioner is to be operated in the automatic mode (604). 3. Also, the outside temperature must be in the range of from 0 to 25° C. (606). 4. Furthermore, it should not rain (608); and 5. the air capacity should be larger than or equal to a defined automatic fan capacity (612). These quantities can be derived from the respective existing signals and sensors (reference numbers 601, 603, 605, 607, 609, 610 and 611). In the case of deviations of, for example, the fresh air operation or the automatic operation, the evaporator temperature control can also be operated via the illustrated diagram but by means of different limit values and safeties.

Figure 10:
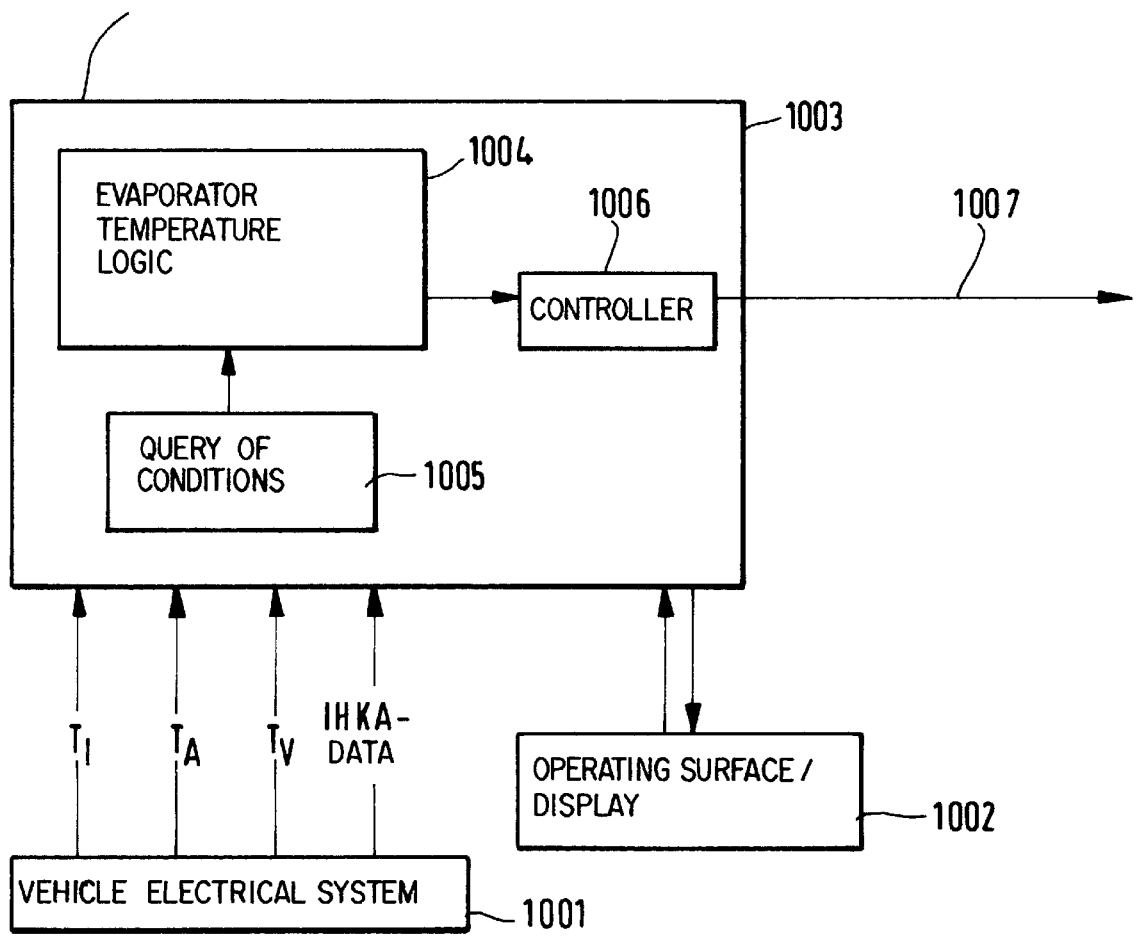
FIG. 10 is a block diagram which illustrates an evaporator temperature control system in a vehicle according to the invention.

A schematic block diagram for a control unit for carrying out the above-described method according to the invention is illustrated in FIG. 10. The sun radiation, outside humidity, and rate of air flow signals were not taken into account. The vehicle's existing electrical control and sensor system 1001 provides the required temperature data $T_I$ ($T_{interior}$), $T_A$ ($T_{outside}$) $T_V$ ($T_{evaporator\ temperature}$) to a computer 1003. Also, additional data of the integrated automatic heating and air-conditioning system (IHKA data) are reported to the computer 1003. The computer 1003 is constructed as a rapid prototyping computer and comprises an evaporator temperature logic 1004, a query device with respect to the presence of required conditions 1005 and a controller 1006. Corresponding to the data received from the vehicle electronic system 1001, an evaporator temperature is read out of the evaporator temperature logic and is reported to the controller 1006, which emits a voltage signal 1007 to an external input of the compressor 2 (compare FIG. 2).

On the whole, the present invention can be implemented in a simple manner and at reasonable cost because only a few new vehicle components are required, specifically a corresponding computer expansion in the heating air-conditioning control unit, as well as a controllable compressor which can be triggered externally. Also, by means of the method according to the invention, fuel can be saved by the temporary raising of the evaporator temperature. It is estimated that the savings potential is at an annual average of approximately 25% with respect to a conventional control.

Applied to the total fuel consumption of a vehicle, depending on the average consumption of the vehicle, this results in savings in the order of 1–4%.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an evaporator temperature of a vehicle air conditioner having an evaporator, a compressor, a condenser and an expansion element, in which the evaporator temperature is adjusted as a function of operating conditions, the method comprising the acts of:

determining a first evaporator temperature value for a desired air humidity, said first evaporator temperature value being defined such that a specific enthalpy is less than a comfort limit value;

determining a second evaporator temperature value to ensure a sufficient cooling capacity; and selecting a lowest one of the first and second evaporator temperature values as the evaporator temperature to be set.

2. The method according to claim 1, wherein the act of determining the first evaporator temperature comprises the act of determining the first evaporator temperature value as a function of both a misting criteria and the specific enthalpy serving as a comfort criteria.

3. The method according to claim 1, further comprising the act of determining the specific enthalpy from a vehicle interior humidity and a vehicle interior temperature.

4. The method according to claim 3, wherein a window temperature serves as the misting criteria, said misting criteria being defined such that a dew temperature is greater than the window temperature.

5. The method according to claim 4, further comprising the act of determining the window temperature from an ambient temperature and a vehicle interior temperature.

6. The method according to claim 2, wherein a window temperature serves as the misting criteria, said misting criteria being defined such that a dew temperature is greater than the window temperature.

7. The method according to claim 6, further comprising the act of determining the window temperature from an ambient temperature and a vehicle interior temperature.

8. The method according to claim 1, wherein the act of determining the second evaporator temperature value comprises the act of selecting the second evaporator temperature value as a function of both heating/cooling and a blow-in quantity of blow-in air.

9. The method according to claim 8, wherein the act of determining the second evaporator temperature value factors into account at least one of an ambient temperature, a vehicle interior temperature, a temperature of adjoining components, and sun radiation.

10. The method according to claim 1, wherein when defined required operating conditions are non-existent, control either changes-over to a constant evaporator temperature or an adapted replacement value generating act for the evaporator temperature takes place.

11. The method according to claim 10, wherein said defined required operating conditions are at least one of a fresh-air operation, an automatic operation, an operation without rain, a minimum air capacity and a specific outside temperature range.

12. A control method for an evaporator temperature of a vehicle air conditioner, the method comprising the acts of:

determining a first evaporator temperature value for a desired air humidity, said first evaporator temperature value being defined such that a specific enthalpy is less than a comfort limit value;

determining a second evaporator temperature value to ensure sufficient cooling capacity; and setting the evaporator temperature to a lowest one of said first and second evaporator temperature values.

13. An evaporator temperature control unit for a vehicle air conditioner, comprising:

a vehicle interior humidity sensor;

a vehicle interior temperature sensor;

a vehicle window temperature sensor;

an ambient temperature sensor;

an adjoining component's temperature sensor;

a sun radiation sensor;

a controller receiving signals from each of said sensors, said controller operating to determine a first evaporator temperature value with respect to a desired air humidity as a function of a misting criteria and comfort criteria, said misting criteria being defined such that a dew temperature does not fall below the window temperature and said comfort criteria is a specific enthalpy determined from the vehicle interior humidity and the vehicle interior temperature such that the specific enthalpy is less than a comfort limit value;

wherein said controller further determines a second evaporator temperature value factoring into account at least one of the ambient temperature, the vehicle interior temperature, the adjoining components temperature, and the sun radiation;

said controller comparing the first and second evaporator temperature values and setting the evaporator temperature to be the lowest value.

* * * * *